Oct. 31, 1967  A. D. CAMINITI  3,349,977
SPARE TIRE CARRIERS AND/OR LUGGAGE RACKS
Filed Aug. 18, 1966  3 Sheets-Sheet 1
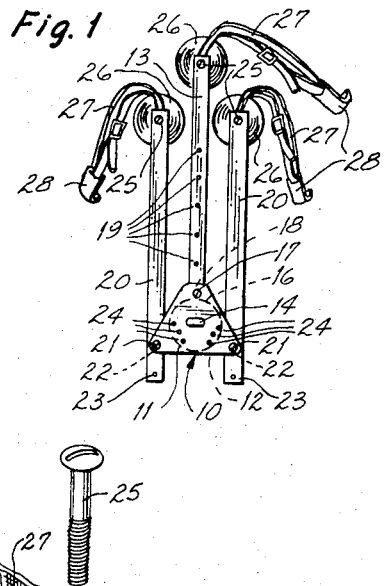
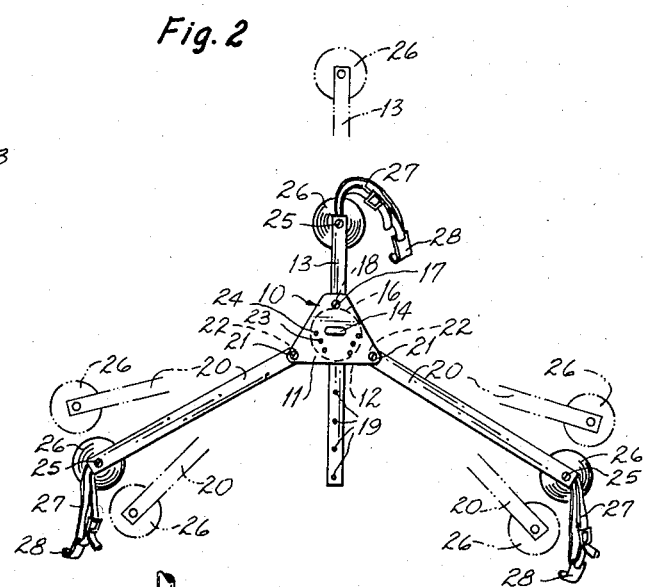
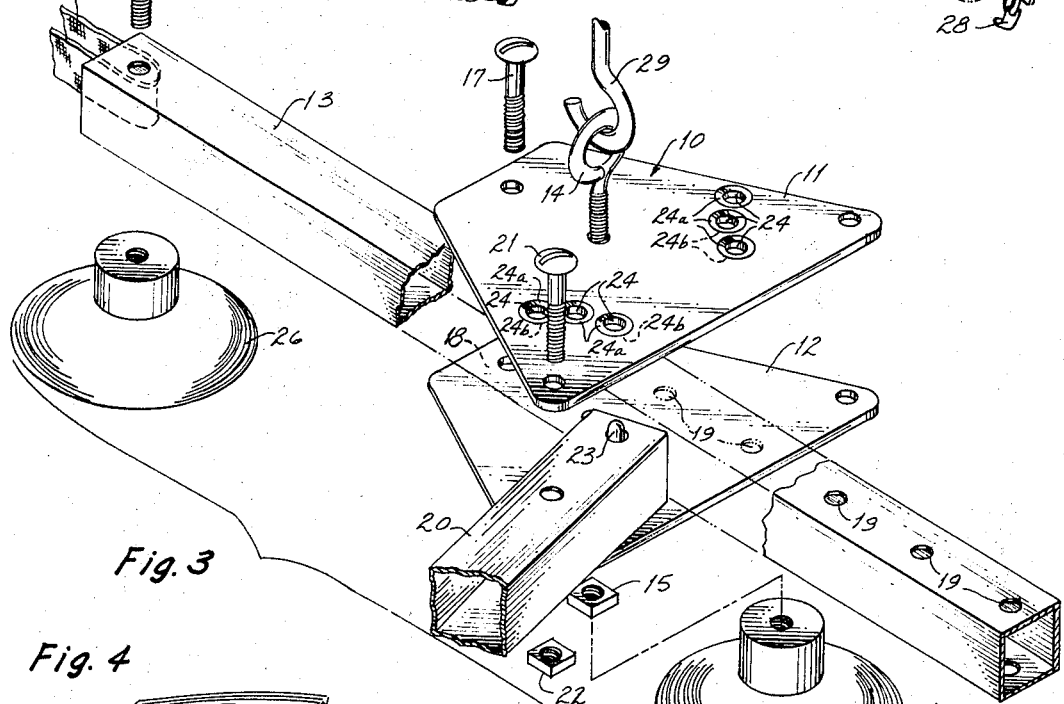
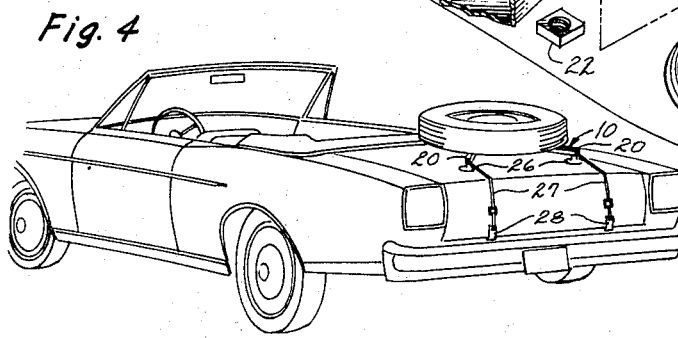
Anthony D. Caminiti
INVENTOR.
BY Anthony D. Caminiti Oct. 31, 1967     A. D. CAMINITI     3,349,977
SPARE TIRE CARRIERS AND/OR LUGGAGE RACKS
Filed Aug. 18, 1966     3 Sheets-Sheet 2
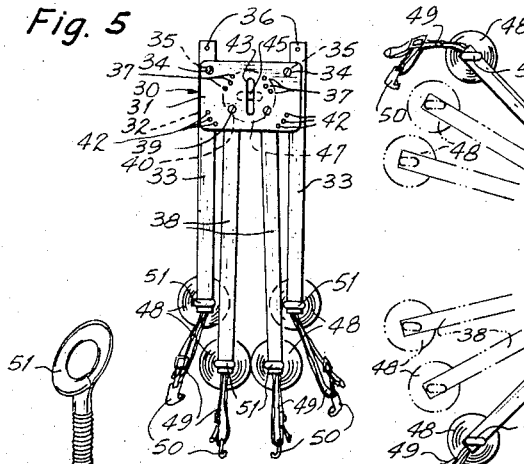
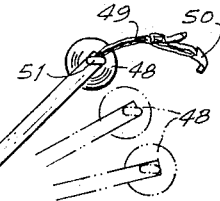
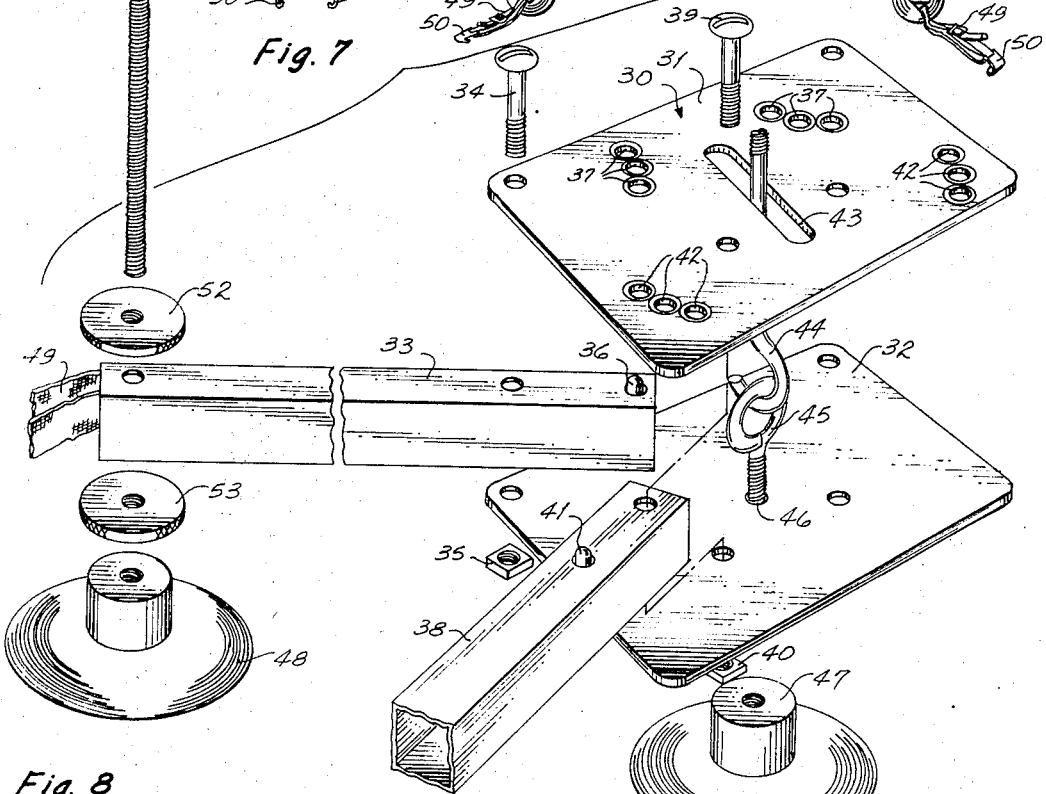
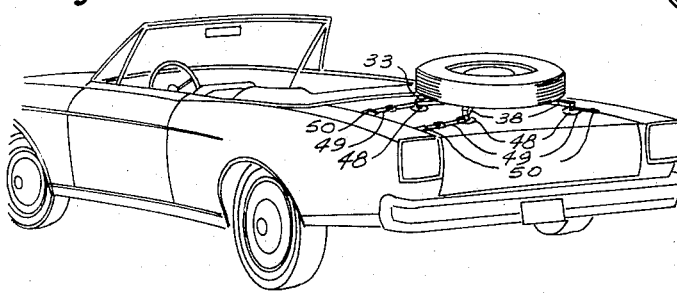
Anthony D. Caminiti
INVENTOR
BY Anthony D. Caminiti

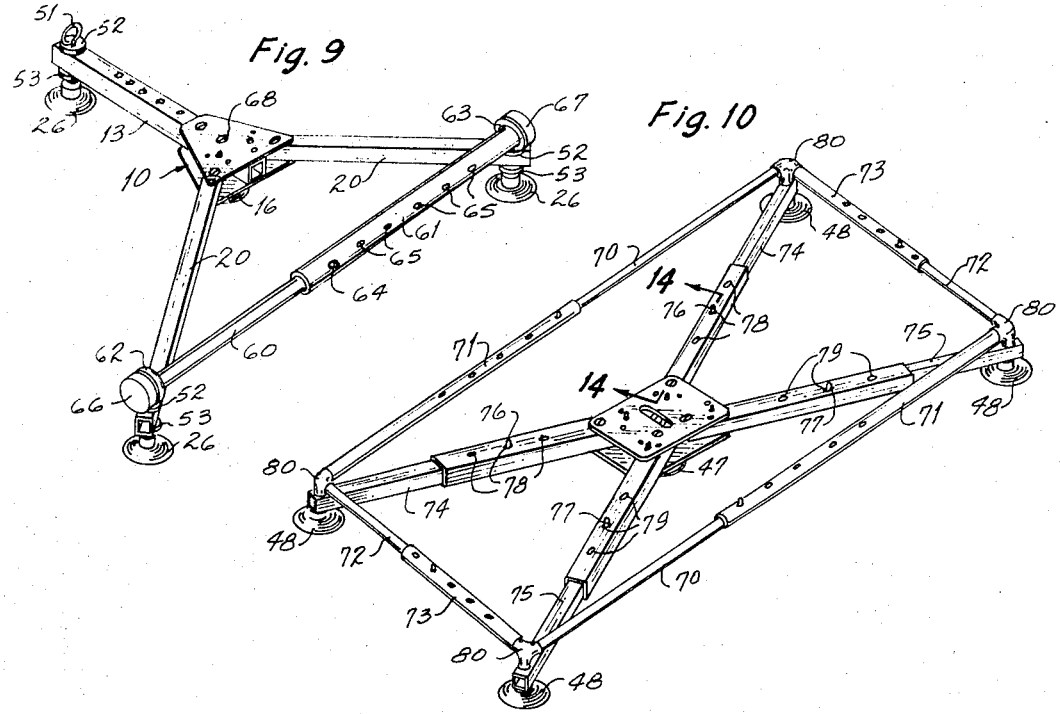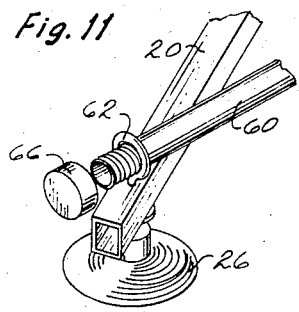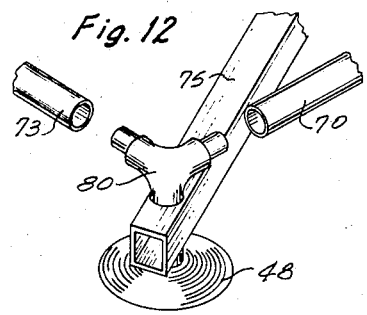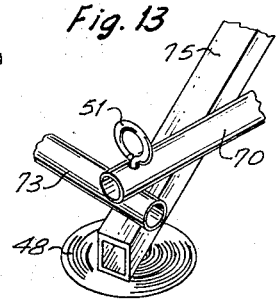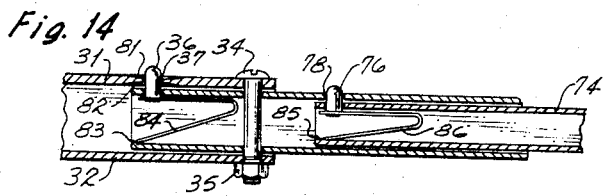
Anthony D. Caminiti
INVENTOR
BY Anthony D. Caminiti

United States Patent Office 3,349,977
Patented Oct. 31, 1967

3,349,977
SPARE TIRE CARRIERS AND/OR LUGGAGE
RACKS
Anthony D. Caminiti, 3824 Santiago St.,
Tampa, Fla. 33609
Filed Aug. 18, 1966, Ser. No. 573,368
9 Claims. (Cl. 224—42.1)

ABSTRACT OF THE DISCLOSURE

A foldable auxiliary spare tire and luggage rack consisting of two spaced hub plates with a plurality of pivotable legs extending therefrom. One hub plate and the outer ends of the legs have suction cups which affix to the vehicle.

---

This invention relates to new and useful improvements in spare tire carriers and/or luggage racks for automobiles and other similar vehicles, and the principal object of the invention is to provide an auxiliary spare tire carrier and/or luggage rack which, under certain circumstances, may be advantageously used in substitution for and/or in addition to the usual carrier and/or luggage rack with which the vehicle is ordinarily equipped.

In accordance with present day practice, the spare tire is usually supported by a carrier which is disposed inside the trunk compartment of the automobile. The tire is of considerable size and occupies a large volume of space in the trunk compartment, particularly in instances where the trunk compartment is relatively small. Thus, when the trunk compartment is loaded, such as for example, while travelling on long trips, the presence of the spare tire therein results in a substantial loss of space which could otherwise be usefully employed to accommodate luggage, or the like.

The present invention eliminates this disadvantage by permitting the spare tire to be removed from the trunk compartment and carried exteriorly of the vehicle, such as for example, on the outside of the trunk lid or deck, so that the space otherwise occupied by the tire in the trunk compartment becomes available for luggage or other material placed in the trunk.

An important feature of the invention, therefore, resides in the provision of an auxiliary spare tire carrier and/or luggage rack which is adapted for attachment exteriorly to the vehicle body, such as to the trunk deck or to the roof deck, while another important feature resides in the provision of means for removably retaining the auxiliary carrier and/or luggage rack in position, these means being so arranged that they do not scratch, mar, or otherwise damage the automobile.

Another important feature of the invention resides in arranging the auxiliary carrier and/or luggage rack so that it may be quickly and easily folded into a compact form and conveniently stored away when it is not in use.

Some of the advantages of the invention reside in its simplicity of construction and operation, in its durability, in its adaptability for use with automobiles of various types and sizes, and its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a top plan view of one embodiment of the present invention in its collapsed position.

FIGURE 2 is a top plan view of the same embodiment of the present invention in one of its extended positions with several other possible positions indicated by broken lines.

FIGURE 3 is an enlarged fragmentary exploded perspective view of this same embodiment of the present invention showing the main components.

FIGURE 4 is a perspective view showing one preferred method of attachment of the device to the trunk deck lid of a conventional automobile.

FIGURE 5 is a top plan view of another preferred embodiment of the present invention in the collapsed position.

FIGURE 6 is a top plan view of the embodiment of the present invention indicated in FIGURE 5 in one of its extended positions with several alternate possible positions indicated by broken lines.

FIGURE 7 is an enlarged fragmentary exploded perspective view of the same embodiment shown in FIGURES 5 and 6 showing the main components.

FIGURE 8 is a perspective view showing one preferred method of attachment of the device to the trunk deck lid of a conventional automobile.

FIGURE 9 is a perspective view of the first embodiment augmented with a telescoping pair of tubes which form a backstop railing for luggage and the like.

FIGURE 10 is a perspective view of the second embodiment augmented with four sets of telescoping pairs of tubes which form a surrounding railing atop the device.

FIGURE 11 is a fragmentary perspective view of one method of attachment of the backstop railing indicated in FIGURE 9.

FIGURE 12 is a fragmentary perspective view of one method of attachment of the surrounding railing indicated in FIGURE 10.

FIGURE 13 is a fragmentary perspective view of another method of attachment of the surrounding railing indicated in FIGURE 10.

FIGURE 14 is a fragmentary sectional view taken along the lines 14—14 of FIGURE 10 showing the methods of adjustment of the primary portion of one of the radially adjustable legs and of the extensible secondary portion of one of the legs.

Referring now to the drawings in a specific manner, in FIGURES 1 and 2 the overall device is generally indicated by the numeral 10. At the center portion or hub of the device there is a top plate 11 and a bottom plate 12 held together essentially by bolts as hereinafter described. Sandwiched in between the plates 11 and 12 is a leg 13 secured therein by eyebolt 14, nut 15 and pad or suction cup 16 and bolt 17 and nut 18, said leg being held more or less rigidly by the aforementioned eyebolt and bolt. Leg 13 is provided with a series of spaced holes 19 for extendable and retractable adjustment of the leg within the plates 11 and 12. It should be noted at this point that this adjustment feature is not to be limited to this particular method. Also sandwiched in between the plates 11 and 12 are legs 20 which are pivotally secured therein by bolts 21 and nuts 22, said legs 20 being provided with spring loaded detents 23 which engage the radially spaced holes 24 in the top plate 11, thus providing an easily operable means of radial adjustment of the legs 20. At the outer extremities of the tubular legs 13 and 20 are bolts 25 which threadedly engage pads or suction cups 26. Conventional fabric securement straps 27 with their attendant rubberized metal gutter hooks 28 are looped around the bolts 25 through the open end of the tubular legs for attaching to convenient portions of the automobile.

FIGURE 3 further depicts the aforementioned components in a close-up manner which clarifies the fact that the radially spaced adjustment holes 24 are slightly countersunk or recessed, top and bottom as at 24a and 24b to allow for easier depression of the detents 23, the underside depressions allowing the detents to more easily slide from one hole to another. A J hook 29, sometimes supplied with the spare tire for securement within the trunk, will be supplied with this invention for engagement with the eyebolt 14 for securement of the tire and wheel to the device. A large flat washer and wing nut (neither shown) will also be provided for securement thereto.

FIGURE 4, as previously stated, shows the device in a preferred method of attachment to the trunk deck lid of an automobile, with the securing straps attached to the edges or lips of the lid. It is to be noted that when the wheel and tire are attached in this manner, the weight of the tire and wheel will usually counterbalance the trunk lid when opened all the way up and will remain in a raised position until lowered by the user.

FIGURES 5 and 6 are top plan views of a four-legged version of this same invention, which is generally indicated by the numeral 30. At the center portion or hub of this embodiment, there is a top plate 31 and a lower plate 32, held together essentially by bolts as hereinafter described. Sandwiched in between plates 31 and 32 are two legs 33 pivotally secured therein by bolts 34 and nuts 35, in much the same manner as are legs 20 of the first embodiment, with spring loaded detents 36 located inwardly at the inner terminus of the legs 33, said detents serving to engage the radially spaced holes 37 in the upper plate 31, thereby providing an easily operable means of radial adjustment of legs 33.

Also sandwiched in between the plates 31 and 32 are another pair of legs 38, which are pivotally secured therein by bolts 39 and nuts 40. As may be more readily seen in FIGURE 7, legs 38 differ from legs 33 and 20 in that the pivot bolts pass through the legs 38 at the inner terminus of the legs, while adjusting detents 41 are located outwardly from the pivot point and engage the radially spaced holes 42 in the top plate 31. Obviously, this arrangement permits the more or less parallel position of the legs in the collapsed position indicated in FIGURE 5. At the center of the upper plate 31 is an elongated hole or slot 43 to permit entry of a J hook 44 which engages the eyebolt 45 located in a hole 46 at the center of the lower plate 32, said eyebolt being threadedly fastened to a pad or suction cup 47. The J hook 44 is used in conjunction with a large washer and wingnut to secure a spare tire and wheel, as in the first embodiment. All four legs in this second version are provided with pads or suction cups 48, and straps 49 and gutter hooks 50, which are secured thereon, in this case, by somewhat lengthy eyebolts 51, said eyebolts being provided with one or more knurled finger nuts 52 and 53. The purpose of this arrangement is to allow perpendicular adjustment of each leg to compensate for the predetermined contour of any given deck, roof, or other surface to which the device is attached. The lower finger nut 53 is for actual adjustment, while the upper finger nut 52, when tightened down, affords a means of locking the adjustment. It is to be noted, however, that any similar means of adjustment, such as nuts and washers, may be used without departing from the scope or intent of this feature, and, likewise, in actual practice, it may be unnecessary to provide a locking finger nut on top, as depicted in FIGURE 7.

FIGURE 6, as previously stated, depicts the four legged embodiment in an extended position while alternate positions are indicated in broken lines.

FIGURE 8 shows the four legged device in a preferred method of attachment to the trunk lid of an automobile and all statements regarding FIGURE 4 are applicable to this figure.

FIGURE 9 illustrates the use of telescoping tubes 60 and 61 passing through eyebolts 62 and 63 to provide a railing type backstop on the three legged embodiment for use as a luggage rack. Note that tube 60 has a spring loaded detent 64 which engages spaced holes 65 in the tube 61 and that tube 60 is threadedly secured to eyebolt 62 by the threaded end cap 66 and tube 61 is threadedly secured to eyebolt 63 by a similar threaded end cap 67. This arrangement is more readily seen in FIGURE 11. Also, it is to be noted that the various methods of adjustable securement of pads or suction cups would be interchangeable from one embodiment to the other. It may be further noted that the center eyebolt of the three legged embodiment would be substituted by an ordinary bolt 68.

In FIGURE 10, four sets of telescoping tubes 70 and 71, 72 and 73 may form a surrounding railing on the four legged version. While these sets of tubing are depicted with detents and adjusting holes, it is conceivable that by the nature of their attachment and the more or less rigid positioning of the legs, that these detents would not be necessary. However, it is to be noted that in the embodiment shown in FIGURE 10, telescoping legs are provided on this four legged version, and these legs 74 and 75 are, indeed, provided with spring loaded detents 76 and 77 respectively and adjustment holes 78 and 79 respectively. The telescoping railings are received onto bifurcate fittings 80 as more readily seen in FIGURE 12.

FIGURE 13 merely illustrates another method of attaching the telescoping surrounding railings shown in FIGURE 10, and is, in fact, one method contemplated when eliminating detents from the railing as stated in the previous paragraph.

Referring now to FIGURE 14, a top plate 31 and bottom plate 32 sandwich a leg 33, pivotally securing the leg therebetween with a bolt 34 and nut 35. A spring loaded detent 36 engages a hole 37 with counter-sunk depressions 81 and 82. When a detent such as 36 is installed in the manner shown, i.e., at the inner terminus of a leg, it is desirable to form a restraining dent or dimple as at 83 to prevent the lower end of the leaf spring member 84 of the detent 36 from slipping outwardly from the end of the tubing. The tubular inner extendable leg portion 74 is provided with detent 76 which engages a hole 78 and likewise as with detent 36, a restraining dimple 85 is provided at the terminus of the inner leg 74 to preclude slippage of the spring leaf 86.

From the foregoing descriptions and explanations there has been shown several embodiments and combinations of said embodiments of certain new and useful features of a proposed tire and/or luggage rack. Other variations and modifications may become apparent to those skilled in the related art. Accordingly, it is not desired to limit the invention to this disclosure, and various modifications may be resorted to, such as may lie within the spirit and scope of the appended claims.

What is claimed as new is:

1. An auxiliary spare tire and luggage rack designed for positioning exteriorly on a vehicle comprising a pair of hub plates, at least three legs each having a suction cup affixed to one end thereof for affixing said ends to said vehicle, the opposite end of each of said legs being sandwiched between and pivotally affixed to said pair of hub plates so as to be positionably adjustable and foldable substantially parallel to one another for storage, one of said hub plates having an eyebolt extending into the space between said hub plates, and the other of said hub plates having a slot to permit entry of a J hook to engage said eyebolt, said eyebolt having a suction cup on its end removed from the eye of said eyebolt and outside said hub plate for securing said hub plate to said vehicle.

2. The auxiliary spare tire and luggage rack of claim 1, wherein one of said hub plates has a plurality of spaced adjustment holes therein and said legs each have detent means thereon which engage individual ones of said adjustment holes to releasably lock said legs in a predetermined position.

3. The auxiliary spare tire and luggage rack of claim 1, further including adjustment means for positionably adjusting the vertical height between the suction cups on the ends of said legs with respect to the ends of said legs whereby said rack can be adjusted to the contour of said vehicle.

4. The auxiliary spare tire and luggage rack of claim 3 wherein said adjustment means on each of said legs comprises a shaft extending through said leg and having one end thereof affixed to said suction cup, and threaded fastening means on said shaft disposed atop said leg and below said leg between said leg and said suction cup, respectively, said threaded fastening means permitting said shaft to be adjustably extended through said leg and being operable to lock said shaft in an extended position.

5. The auxiliary spare time and luggage rack of claim 1, wherein at least one of said legs has a plurality of spaced apertures therein for receiving fastening means to adjustably lengthen the length of said leg to fit said rack to said vehicle.

6. The auxiliary spare tire and luggage rack of claim 1, further including railing means affixed between the ends of at least two of said legs for forming a backstop for securing articles on said rack.

7. The auxiliary spare tire and lugggage rack of claim 6, wherein said railing means comprises a telescoping tube.

8. The auxiliary spare tire and luggage rack of claim 1 wherein each of said legs is telescopically constructed to permit inward and outward extension of said legs from said pair of hub plates, whereby the size of said rack can be adjusted.

9. The auxiliary spare tire and luggage rack of claim 1 further including telescoping rail means affixed between the ends of respective pair of said legs to form a backstop for securing articles on said rack.

References Cited

UNITED STATES PATENTS

| 1,612,403 | 12/1926 | Wachtel et al. | 224—42.29 X |
| 1,881,223 | 10/1932 | Nichols et al. | 224—42.29 X |
| 2,839,232 | 6/1958 | Homeier | 224—42.12 |
| 2,970,728 | 2/1961 | Haas | 224—42.1 X |
| 3,143,264 | 8/1964 | Spero | 224—42.1 |

FOREIGN PATENTS

| 1,142,611 | 4/1957 | France. |
| 1,333,369 | 6/1963 | France. |

GERALD M. FORLENZA, *Primary Examiner.*

R. J. SPAR, *Examiner.*